United States Patent [19]
Olsson

[11] Patent Number: 4,535,949
[45] Date of Patent: Aug. 20, 1985

[54] LENGTH MEASURING DURING ROLLING UP OF THIN MATERIAL

[75] Inventor: Ingemar Olsson, Vesteras, Sweden

[73] Assignee: ASEA Aktiebolag, Västerås, Sweden

[21] Appl. No.: 619,826

[22] Filed: Jun. 12, 1984

[30] Foreign Application Priority Data

Jun. 13, 1983 [SE] Sweden ................................ 8303343

[51] Int. Cl.³ ...................... B65H 17/12; B65H 25/00
[52] U.S. Cl. ........................................ 242/57; 242/66;
33/133; 364/562
[58] Field of Search ............. 242/57, 66, 75.51, 56 R,
242/58.1, 58.5, 67.1 R, 67.2, 67.3 R; 33/129,
133, 142; 364/562

[56] References Cited

U.S. PATENT DOCUMENTS

| | | | |
|---|---|---|---|
| 3,058,223 | 10/1962 | Schmidt et al. | 33/129 |
| 3,208,683 | 9/1965 | Thompson | 242/57 |
| 3,663,806 | 5/1972 | Drankhan et al. | 242/57 |
| 4,089,482 | 5/1978 | Mooney et al. | 242/57 X |
| 4,159,572 | 7/1979 | Nunes | 242/57 X |

FOREIGN PATENT DOCUMENTS 43156 4/1981 Japan ...................................... 242/57

Primary Examiner—John M. Jillions
Attorney, Agent, or Firm—Watson, Cole, Grindle & Watson

[57] ABSTRACT

A device for measuring the rolled-up length of web forming a roll when a web break has occurred during formation of the roll employs a web break indicator to indicate a web break. Normal web length measuring is carried out by counting pulses from a pulse transducer driven by a roller turned by the moving web and this is stopped on web break. A calculation of the circumference of the web roll on the occasion of the web break is made with the further aid of a pulse transducer on the shaft of the web roll and a counter and logic unit. Too loosely wound web material is removed from the roll and the circumference of the roller decreases. After joining the web and renewed winding, a calculation of the roll circumference is continuously performed by means of the pulse transducers. When the circumference of the roll resumes the size it had at the moment the web break occurred, normal length measuring is automatically resumed.

4 Claims, 2 Drawing Figures

LENGTH MEASURING DURING ROLLING UP OF THIN MATERIAL

BACKGROUND OF THE INVENTION

1. Technical Field

The invention relates to a length-measuring device used in connection with the rolling-up of thin, relatively soft, sheet material, such as paper and foil of aluminum, plastics, etc. Thus, the invention will find useful applications in paper mills, in foil-making mills and by manufacturers of plastics foils.

2. Prior Art

The rolling up of thin sheet material into a roll is performed either with the aid of a center-driven rolling-up device or with the aid of a circumferentially driven device. The rolled-up material will subsequently be used for the manufacture of books, newspapers, etc., and for a wide variety of other products which employ rolled-up sheet material as the "raw material". From the point of view of subsequent use, it is very important that the roll during its production is evenly wound and has a compact structure. This compact winding can be achieved in several different ways, for example by using a control means which strives to maintain a constant tension in the sheet material which is independent of the diameter and rotational speed of the roll. Numerous more or less sophisticated devices exist for dealing with this problem.

Length measuring of the rolled-up material is, in principle, very simple to perform. Before being wound on the roll, the sheet material normally passes some kind of deflector or supporting roller. By connecting a pulse transducer to the deflector or supporting roller, a measure of the rolled-up length can be obtained in a simple manner provided the diameter of the deflector or supporting roller is known.

Rolled material is often ordered in the form of a roll containing a specified number of meters of the sheet material in question. Therefore, the rolling-up plant will usually include apparatus for setting the desired length of the material on the roll. In such plant, a value obtained by means of the length-measuring device is compared continuously with the desired length, and when a certain material length remains to be wound on the roll, a retardation process in the rolling-up machine is started so that, as the correct wound-on length is achieved, the rolling-up operation can be stopped. Since the moment of inertia of the roll may be considerable, a retardation to practically zero speed on the approach to a measured, correct material length, is necessary.

Despite the provision of a variety of different control devices for controlling the wind-up process, ruptures of the material web arise more frequently than is desirable. The rolling-up machinery must then be stopped, loosely wound material on the roll must be removed, and the separated web parts must be rejoined. This operation affects the accuracy of length measuring, and to obtain an approximate agreement between the desired, set length and the actual rolled-up length, an estimate of the length of the removed material and of the length used for the join has to be made.

Now, in order to obtain the correct total length of the roll in the case of a joined material web, the previously set value of the desired length is normally increased by the estimated loss of material. Alternatively, the measured value of the rolled-up length may be reduced by the same estimated material loss.

Especially in printing works, printing presses, and the like, it is very important that the true length of the rolled-up material agrees with the stated length. The accuracy of the estimated material loss during the joining of the material web is of necessity not particularly great. There is therefore always a risk that, in rolls where a web break has occurred, the estimate of material lost will be too great and the finished roll will then contain more than the set length.

A direct measuring of the length of rolled-up sheet material on a roll, which has been subjected to a web break and rejoining during the rolling-up operation, has hitherto not been available. It has therefore been necessary to live with a certain uncertainty as regards the real length which is caused by the need to estimate the material lost.

OBJECTS OF THE INVENTION

One object of the invention is to eliminate the uncertainty over the estimation of the length of material removed on the occasion of a web break.

A further object is to improve the accuracy in the statement of total length of a material web wound in a finished roll.

SUMMARY OF THE INVENTION

A web-length measuring device in a web winding machine comprises a unit for setting the desired web length, a pulse transducer connected to a driving supporting roller, a pulse counter for counting the pulses supplied by the pulse transducer, whereby a certain number of pulses correspond to a certain web length, a unit for comparison of the set and the measured web length, units for emitting a retardation signal and a stop signal to drive equipment for the winding machine, and a web break indicator. The device is characterized in that the length measuring is adapted to be stopped when a web break is indicated while at the same time, with the aid of the pulse transducer of the supporting roll and a pulse transducer on the roll, a measuring of the circumference of the roller is effected, the value of which is stored. After joining of the web material and restarting of the winding, the circumference of the roll is adapted to be continuously measured with the aid of the pulse transducers, whereby the actual measured value is continuously compared with the stored value of the circumference of the roller at the moment of web break. When the circumference of the growing roll becomes greater than the stored value, the length measuring of the web material is arranged to be automatically started, the continuous measuring of the circumference of the roller is arranged to be stopped, and all the counters, except the length measuring unit, are arranged to be reset.

BRIEF DESCRIPTION OF THE DRAWINGS

The invention will now be further described, by way of example, with reference to the accompanying drawings, in which.

DESCRIPTION OF PREFERRED EMBODIMENT

Figure 1:
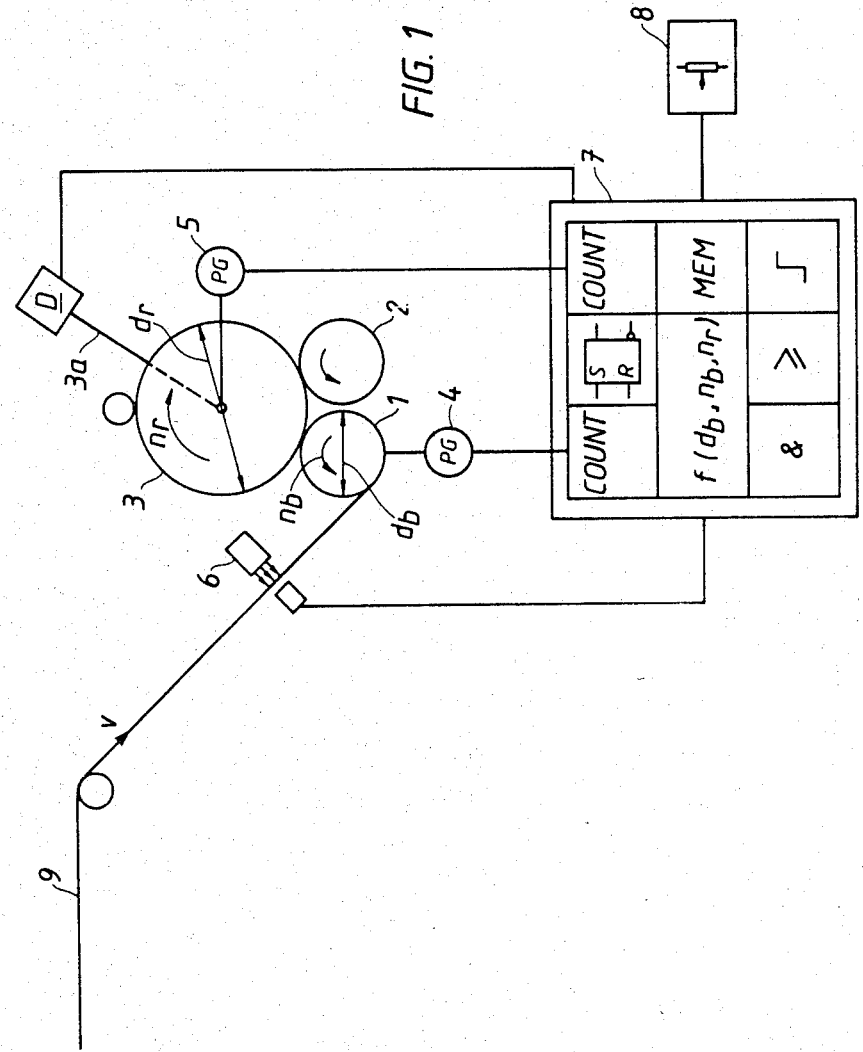
FIG. 1 shows schematically a rolling machine, employing equipment for web length measuring according to the invention.

The principle of the invention is illustrated in FIG. 1. In this case the web-length measuring device is applied to a rolling-up or web winding machine in which a web 9 is fed to a growing web roll 3 circumferentially driven by means of supporting rollers 1 and 2. The device can also be applied to a web-winding machine in which the center of the roll 3 is driven. Connected to the driving supporting roller 1 and to the shaft of the web roll 3 are pulse transducers 4 and 5. Other components included are a roll drive system D including a roll shaft 3a, a web break indicator 6, a counter and logic unit 7 with necessary logic functions (to be described in detail later) and a device 8 for setting the desired length of the web on the roll 3. From the apparatus point of view, this equipment differs from conventional web-winding equipment only by the pule transducer 5 and certain logic and calculating functions in the unit 7. This means that during normal operation, that is, when no web break has occurred, length measuring takes place entirely by means of the pulse transducer 4, and setting of the desired length is performed by means of the device 8. An automatic system for reducing the winding speed when the set length is approached would also be included, but it is not shown in FIG. 1.

Characteristic of this invention is that when a web break occurs, which is indicated by the web break indicator 6, the conventional length measuring operation is stopped. At the same time a careful calculation of the circumference of the roll 3 is performed with the aid of the pulse transducers 4 and 5. The value obtained is stored in a memory. When removing loosely wound-on web material (necessary as part of the web rejoining procedure), the circumference of the roll 3 will decrease. After joining the web ends and restarting the winding on, a calculation of the roller circumference is made continuously with the aid of the pulse transducers 4 and 5. When the circumference of the roll 3 has become equal in size to what it was at the moment of the web break, an automatic restart of the normal length measuring can take place.

By selecting pulse transducers with a high resolution, that is, that generate a large number of pulses per revolution, the desired accuracy can be achieved. The calculation of the circumference of the roll 3 is otherwise a trivial operation, but will be described. With the designations used in FIG. 1, the speed v of the web 9 will be as follows $$v = \pi d_b \times n_b = \pi d_r \times n_r \, (m/s)$$

(where $d_b$, $d_r$ are the diameters of the roller 1 and roll 3, respectively and $n_b$, $n_r$ the respective speeds of revolutions).

The circumference $O_r$ of the roll 3 then becomes $$O_r = \pi d_r = \pi d_b \frac{n_b}{n_r} \quad (m)$$

If the pulse transducer 4 supplies $p_4$ pulses/rev. and the current speed of revolution gives $p_b$ pulses/sec., and if the pulse transducer 5 supplies $p_5$ pulses/rev. and the corresponding speed of revolution gives $p_r$ pulses/sec., the circumference of the roller can be expressed as $$O_r = k \frac{p_b}{p_r} \quad (m)$$

that is, a function which is very simple to calculate electronically.

Figure 2:
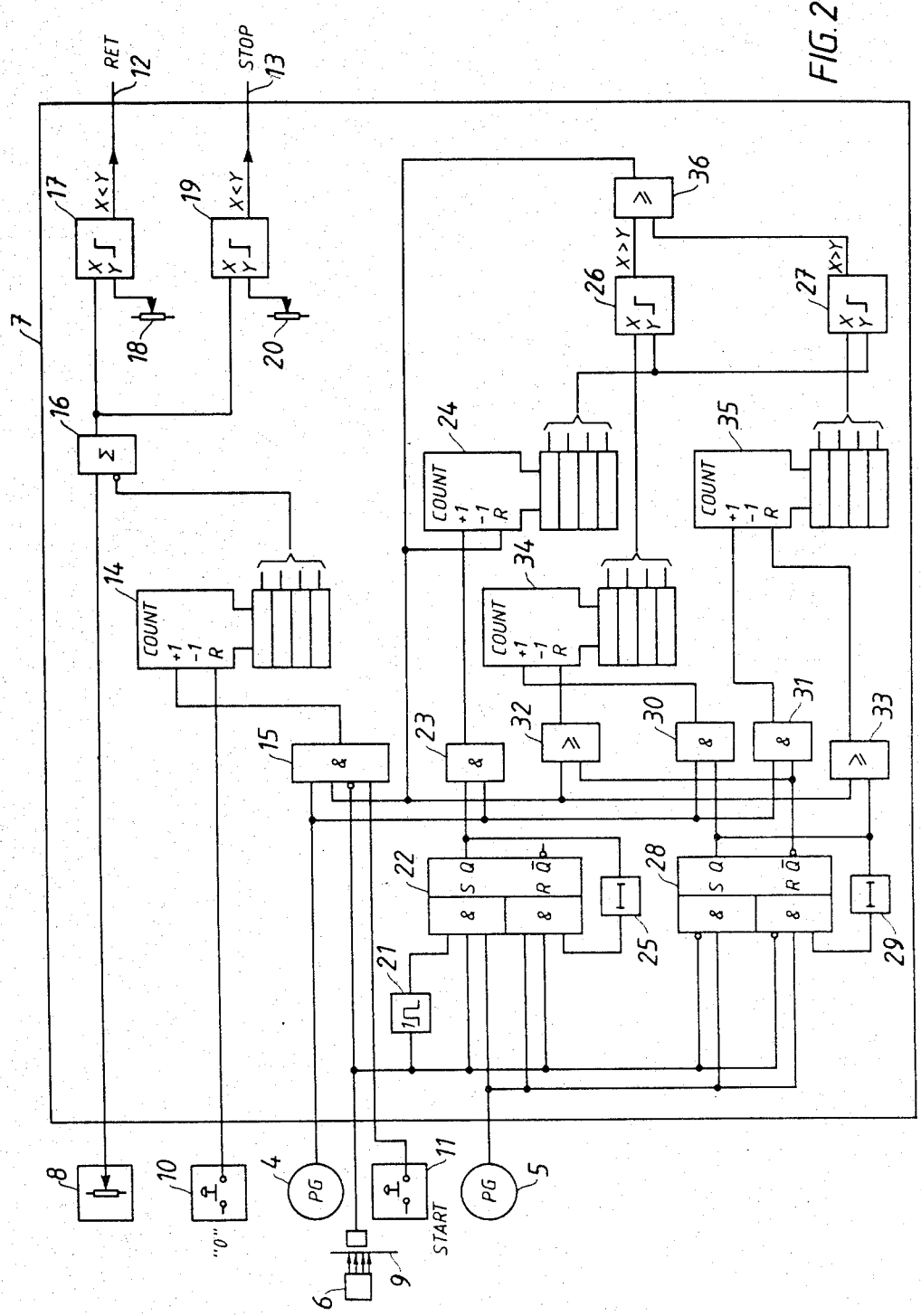
FIG. 2 shows the measuring equipment of FIG. 1 in greater detail.

The construction of a preferred form of measuring equipment will now be described in more detail with reference to FIG. 2. In addition to units 4, 5, 6, 7, 8 and 9 from FIG. 1, a number of additional operating units are shown in FIG. 2. The inputs and outputs of flip-flops and counters in FIG. 2 are marked in accordance with IEC Publication 117.

Upon activation of a resetting unit 10, the length measuring is reset (set to "0"), and upon activation of a START unit 11, the length measuring is initiated. When a certain web length remains to be wound before the desired set length of the material web has been reached, a retardation signal (RET) appears on a line 12 and is supplied to the drive equipment. A STOP signal appears on a line 13 when the set length has been reached.

The counter and logic unit 7 will now be described both with regard to the component parts included therein and the function of the unit. A counter 14 registers the total length of the rolled-up web material in the roll 3. After setting the counter 14 to "0" by the resetting unit 10, the number of pulses from the pulse transducer 4 of the supporting roller 1 are counted via an "and"-element 15 when the START unit 11 is pressed provided there is no indication of a web break by virtue of a signal from the indicator 6 to the inverting input of the element 15. The measured web length is compared in a summator 16 with the desired, set length. The difference value, that is, a measure of the length of the material web that remains to be rolled up, is passed on the one hand to a discriminator 17 which, when a certain length determined by a setting unit 18, remains, delivers the RET signal for retardation, and on the other hand to a discriminator 19 which, when a certain stop length determined by a setting unit 20, remains, delivers the STOP signal.

The part of FIG. 2 described so far corresponds to the prior art and functions satisfactorily as long as no web break occurs.

When a web break does occur, the length measuring operation is immediately stopped since the "and"-element 15 will be set to "0" via the signal from the indicator 6 appearing on the inverting input of the element 15. According to the invention, the circumference of the roll 3 is recorded at the instant of web break. For this registration a monostable flip-flop 21, a bistable flip-flop 22 with "and"-inputs, an "and"-element 23 and a counter 24 are utilized. In the embodiment shown in FIG. 2, the pulse transducer 5 generates one pulse per 360° turn of the roll 3. Upon a web break, the Q-output of the bistable flip-flop 22 is set to "1" when the pulse transducer 5 emits a first pulse. Via a time delay element 25, the Q-output provides a "1" on the "and"-element for the R input only after a certain time delay. A "1" on the Q-output of the flip-flop 22 means that the counter 24, via the "and"-element 23, starts counting pulses from the pulse transducer 4 of the supporting roller 1. Just before the web break occurred, the counter 24 had been reset via a "1" on its R input. Counting of pulses continues until the next pulse is received from the pulse transducer of the roller. At this time, all the "and" inputs on the R side will be set to "1" whereby the Q-output is set to "0", and the counting of pulses from the pulse transducer 4 of the supporting roller 1 is stopped. The recorded number of pulses of the counter 24 from the transducer 4 per roller turn indicates a specific roller circumference. This value is supplied to the discriminators 26 and 27 and constitutes the value (y) at which the length measuring along a web break will be restarted.

When a web break occurs, the rolling-up machine is stopped, the outer turns of web material which are too loosely wound, are removed, and the web parts are rejoined. This means that the circumference of the roll 3, when the machine is restarted, is smaller than it was when the web break occurred. As will be clear from the description of the invention given above, after restarting a continuous calculation of the circumference of the roll 3 takes place, and when the circumference has become equal to the circumference existing at the moment of web break, the length measuring operation is automatically restarted. The units which attend to this consist of a bistable flip-flop 28 with "and"-inputs, a time delay element 29, "and"-elements 30 and 31, "or"-elements 32 and 33, counters 34 and 35, the previously mentioned discriminators 26 and 27 and an "or"-element 36.

When the Q-output of the flip-flop 28 is set to "1", the counter 34 counts and registers, via the "and"-element 30, the actual circumference of the roll 3. The value obtained is passed to the discriminator 26 on its x-input. If x>y, that is, the value x of the actual circumference is greater than the value y of the circumference at the moment of web break, length measuring is restarted via the "or"-element 36. The counters 24, 34 and 35 are thereby set to 0".

If x<y, the measuring of the circumference of the roll 3 continues. At the next pulse from the pulse transducer 5, the Q-output of the flip-flop 28 is set to "0" and the $\overline{Q}$-output is set to "1". The circumference of the roll 3 is now counted and registered by the counter 35 via the "and"-element 31, while at the same time the counter 34 is set to "0" via the "or"-element 32. The thus estimated value of the circumference of the roll 3 is compared in the discriminator 27 with the circumference of the roll 3 at the moment of web break. The result of the comparison brings about the same effect as the comparison in the discriminator 26.

Thus the circumference of the roll 3 is registered every second turn by the counter 34 and during intermediate turns by the counter 35. When the counter 34 is in operation, the counter 35 is set to "0" and vice versa.

ADVANTAGES OF THE INVENTION

For manufacturers of materials which are subsequently to be delivered in the form of a roll, a device according to the invention involves a number of advantages compared to what has been possible with prior art techniques.

Among these may be mentioned:
(A) There is considerably greater correspondence between the desired set length of material and the actual length of material on a roll.
(B) Improved economy is possible since, in the case of rolls which have been subjected to a web break, it is not necessary to over-compensate for lost material to ensure that the roll at least contains the stated length.
(C) There is no need to carry out a time-consuming estimation of the length of lost material, since the device continues the length measuring automatically when the same circumference of the roll has been attained as when the web break occurred.
(D) No adjustment/increase of the set desired web length or a corresponding adjustment/decrease of the measured web length need be carried out when a web break has occurred.

For producers utilizing the rolled-up material as raw material, there are also several advantages compared with what is possible with prior art techniques.

Among these are:
(E) The problems caused by incorrect length measuring are avoided. Setting of the desired size of an edition in, for example, a printing works, can be adapted to the web length stated. If, due to incorrect length, the material web runs out before the edition has been printed, unnecessary inconvenience is caused to the personnel.
(F) The knowledge that the stated web length of the roll corresponds to the real web length results in better utilization of the material, and therefore this knowledge can contribute to an improved economy of operation.

The invention is not limited to the construction described with reference to FIG. 2, since many modifications may be made thereto within the scope of the following claims.

What is claimed is:

1. A measuring device in a winding machine for measuring the length of material wound on a roll when a break in the material has occurred, which device includes
   a unit for setting the desired length of material on the roll,
   a first pulse transducer,
   means connected to the first pulse transducer to monitor the passage of material to the roll and to ensure that the pulse output of the first pulse transducer is related to the length of such material passage,
   a pulse counter for counting the pulses supplied by the first pulse transducer,
   a unit for comparison of the set and the measured length of wound material,
   drive equipment for the roll, and
   a break indicator for sensing any break in the material fed to the roll,
   characterized in that,
   means is provided to measure the circumference of the roll when a material break is indicated while at the same time the length measuring is stopped,
   means to store the said measure of the circumference of the roll and
   means, after rejoining of the material and restart of the winding up, to resume the length measuring when the circumference of the roll acquires the stored value of the circumference of the roll at the moment of material break.

2. A device as claimed in claim 1, in which the circumference of the roll is measured using the first pulse transducer and a second pulse transducer connected to a drive shaft of the roll.

3. A device as claimed in claim 1, in which the first pulse transmitter is connected to a roll support roller.

4. A device as claimed in claim 2, in which the first pulse transmitter is connected to a roll support roller.

* * * * *